US008554544B2

United States Patent
Fux et al.

(10) Patent No.: US 8,554,544 B2
(45) Date of Patent: *Oct. 8, 2013

(54) METHOD FOR GENERATING TEXT THAT MEETS SPECIFIED CHARACTERISTICS IN A HANDHELD ELECTRONIC DEVICE AND A HANDHELD ELECTRONIC DEVICE INCORPORATING THE SAME

(75) Inventors: Vadim Fux, Waterloo (CA); Sergey Kolomiets, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 459 days.

This patent is subject to a terminal disclaimer.

(21) Appl. No.: 12/464,552

(22) Filed: May 12, 2009

(65) Prior Publication Data
US 2009/0221309 A1 Sep. 3, 2009

Related U.S. Application Data

(63) Continuation of application No. 11/119,455, filed on Apr. 29, 2005, now Pat. No. 7,548,849.

(51) Int. Cl.
*G06F 17/21* (2006.01)
*G06F 17/20* (2006.01)
*G06F 17/24* (2006.01)

(52) U.S. Cl.
USPC ............. 704/10; 704/8; 704/9; 704/277

(58) Field of Classification Search
USPC ........ 704/1–10, 276–278, E11.001–E11.004; 369/47.1–47.13, 83–99; 700/90–94
See application file for complete search history.

(56) References Cited

U.S. PATENT DOCUMENTS

| 4,984,177 | A | | 1/1991 | Rondel et al. |
| 4,994,966 | A | * | 2/1991 | Hutchins ........................ 704/9 |
| 5,377,280 | A | * | 12/1994 | Nakayama .................. 382/229 |
| 5,490,061 | A | | 2/1996 | Tolin et al. |

(Continued)

FOREIGN PATENT DOCUMENTS

| EP | 1 225 184 A | 11/2002 |
| EP | 1320023 A2 | 6/2003 |

(Continued)

OTHER PUBLICATIONS

Lai, Yu-Shen et al. "Unknown Word and Phrase Extraction Using a Phrase-Like-Unit-Based Likelihood Ratio." International Journal of Computer Processing of Oriental Languages. vol. 13, Issue 1: Mar. 2000. pp. 83-95.*

(Continued)

*Primary Examiner* — Pierre-Louis Desir
*Assistant Examiner* — David Kovacek
(74) *Attorney, Agent, or Firm* — Finnegan, Henderson, Farabow, Garrett & Dunner, LLP

(57) ABSTRACT

Incoming e-mails, instant messages, SMS, and MMS, are scanned for new language objects such as words, abbreviations, text shortcuts and, in appropriate languages, ideograms, that are placed in a list for use by a text input process of a handheld electronic device to facilitate the generation of text. Systems and methods consistent with the present invention may gather new language objects from sources of text external to the handheld electronic device, and may ignore new language objects that are not considered to be in a current language of the handheld electronic device.

4 Claims, 4 Drawing Sheets

(56) References Cited

U.S. PATENT DOCUMENTS

| | | | |
|---|---|---|---|
| 5,526,259 A * | 6/1996 | Kaji | 704/3 |
| 5,608,624 A | 3/1997 | Luciw | |
| 5,943,643 A * | 8/1999 | Van De Veen | 704/2 |
| 6,002,998 A * | 12/1999 | Martino et al. | 704/9 |
| 6,026,410 A | 2/2000 | Allen et al. | |
| 6,208,435 B1 | 3/2001 | Zwolinski | |
| 6,219,731 B1 | 4/2001 | Gutowitz | |
| 6,233,546 B1 * | 5/2001 | Datig | 704/7 |
| 6,286,064 B1 | 9/2001 | King et al. | |
| 6,307,548 B1 | 10/2001 | Flinchem et al. | |
| 6,321,188 B1 * | 11/2001 | Hayashi et al. | 704/4 |
| 6,490,492 B1 | 12/2002 | Fertig et al. | |
| 6,553,103 B1 | 4/2003 | Forlenza et al. | |
| 6,801,190 B1 | 10/2004 | Robinson et al. | |
| 6,810,376 B1 * | 10/2004 | Guan et al. | 704/9 |
| 6,991,162 B2 | 1/2006 | Chang | |
| 7,146,381 B1 * | 12/2006 | Allen et al. | 1/1 |
| 7,162,086 B2 * | 1/2007 | Ikeda | 382/182 |
| 7,174,295 B1 | 2/2007 | Kivimaki | |
| 7,389,124 B2 * | 6/2008 | Fux et al. | 455/550.1 |
| 7,403,890 B2 * | 7/2008 | Roushar | 704/9 |
| 7,430,716 B2 | 9/2008 | Weir | |
| 7,447,627 B2 | 11/2008 | Jessee et al. | |
| 7,548,849 B2 * | 6/2009 | Fux et al. | 704/9 |
| 7,620,540 B2 * | 11/2009 | Fux et al. | 704/8 |
| 2001/0029455 A1 * | 10/2001 | Chin et al. | 704/277 |
| 2002/0045463 A1 * | 4/2002 | Chen et al. | 455/566 |
| 2002/0049831 A1 * | 4/2002 | Platner et al. | 709/218 |
| 2002/0103646 A1 | 8/2002 | Kochanski et al. | |
| 2002/0111792 A1 * | 8/2002 | Cherny | 704/8 |
| 2002/0116528 A1 | 8/2002 | Vale | |
| 2003/0023422 A1 * | 1/2003 | Menezes et al. | 704/2 |
| 2003/0040899 A1 * | 2/2003 | Ogilvie | 704/2 |
| 2003/0073451 A1 | 4/2003 | Kraft | |
| 2003/0078766 A1 * | 4/2003 | Appelt et al. | 704/9 |
| 2003/0154071 A1 * | 8/2003 | Shreve | 704/9 |
| 2003/0189731 A1 | 10/2003 | Chang | |
| 2003/0200078 A1 * | 10/2003 | Luo et al. | 704/2 |
| 2003/0204392 A1 | 10/2003 | Finnigan et al. | |
| 2004/0034521 A1 * | 2/2004 | Kawakura et al. | 704/1 |
| 2004/0078191 A1 * | 4/2004 | Tian et al. | 704/9 |
| 2004/0102957 A1 | 5/2004 | Levin | |
| 2004/0104896 A1 | 6/2004 | Suraqui | |
| 2004/0155869 A1 | 8/2004 | Robinson et al. | |
| 2004/0239533 A1 | 12/2004 | Bollman | |
| 2004/0263486 A1 | 12/2004 | Seni | |
| 2005/0071150 A1 * | 3/2005 | Nasypny | 704/9 |
| 2005/0091030 A1 | 4/2005 | Jessee et al. | |
| 2005/0108017 A1 * | 5/2005 | Esser et al. | 704/277 |
| 2005/0114770 A1 | 5/2005 | Sacher et al. | |
| 2005/0125217 A1 | 6/2005 | Mazor | |
| 2005/0125218 A1 * | 6/2005 | Rajput et al. | 704/8 |
| 2005/0197828 A1 | 9/2005 | McConnell et al. | |
| 2005/0251382 A1 * | 11/2005 | Chang et al. | 704/9 |
| 2005/0273332 A1 | 12/2005 | Scott et al. | |
| 2005/0283540 A1 * | 12/2005 | Fux et al. | 710/1 |
| 2006/0028450 A1 | 2/2006 | Suraqui | |
| 2006/0041422 A1 | 2/2006 | Davis et al. | |
| 2006/0119583 A1 | 6/2006 | Potera | |
| 2006/0136223 A1 * | 6/2006 | Brun et al. | 704/277 |
| 2006/0217965 A1 | 9/2006 | Babu | |
| 2006/0247916 A1 * | 11/2006 | Fux et al. | 704/8 |
| 2006/0247917 A1 * | 11/2006 | Fux et al. | 704/9 |
| 2007/0239434 A1 | 10/2007 | Rubanovich et al. | |
| 2007/0294078 A1 * | 12/2007 | Kim et al. | 704/2 |
| 2008/0097745 A1 * | 4/2008 | Bagnato et al. | 704/8 |
| 2009/0221309 A1 * | 9/2009 | Fux et al. | 455/466 |

FOREIGN PATENT DOCUMENTS

| | | |
|---|---|---|
| EP | 1 480 421 A | 11/2004 |
| GB | 2 396 940 A | 7/2004 |
| WO | 97/05541 A1 | 2/1997 |
| WO | 2004059958 | 7/2004 |

OTHER PUBLICATIONS

Beesley, Kenneth R., "Language Identifier: A Computer Program for Automatic Natural-Language Identification of On-Line Text", Automated Language Processing Systems, 'Online!, pp. 1-21, XP002342527, URL http://www.xrce.xerox.com/competencies/content-analysis/tools/publis/langid.pdf> Sep. 5, 2005.

Examination Report, dated Jul. 19, 211, from the Canadian Intellectual Property Office, in Application No. 2,606,328.

* cited by examiner

METHOD FOR GENERATING TEXT THAT MEETS SPECIFIED CHARACTERISTICS IN A HANDHELD ELECTRONIC DEVICE AND A HANDHELD ELECTRONIC DEVICE INCORPORATING THE SAME

CROSS-REFERENCE TO RELATED APPLICATION

The instant application is a continuation of and claims priority to U.S. patent application Ser. No. 11/119,455, filed Apr. 29, 2005 now U.S. Pat. No. 7,548,849, entitled "METHOD FOR GENERATING TEXT THAT MEETS SPECIFIED CHARACTERISTICS IN A HANDHELD ELECTRONIC DEVICE AND A HANDHELD ELECTRONIC DEVICE INCORPORATING THE SAME", the entire contents of which are incorporated herein by reference.

BACKGROUND

1. Technical Field

Aspects of the invention relate to generating text in a handheld electronic device and to expediting the process, such as for example, where the handheld electronic device receives text from sources external to the device.

2. Background Information

Generating text in a handheld electronic device examples of which include, for instance, personal data assistants (PDA's), handheld computers, two-way pagers, cellular telephones, text messaging devices, and the like, has become a complex process. This is due at least partially to the trend to make these handheld electronic devices smaller and lighter in weight. A limitation in making them smaller has been the physical size of keyboard if the keys are to be actuated directly by human fingers. Generally, there have been two approaches to solving this problem. One is to adapt the ten digit keypad indigenous to mobile phones for text input. This requires each key to support input of multiple characters. The second approach seeks to shrink the traditional full keyboard, such as the "qwerty" keyboard by doubling up characters to reduce the number of keys. In both cases, the input generated by actuation of a key representing multiple characters is ambiguous. Various schemes have been devised to interpret inputs from these multi-character keys. Some schemes require actuation of the key a specific number of times to identify the desired character. Others use software to progressively narrow the possible combinations of letters that can be intended by a specified sequence of key strokes. This latter approach uses multiple lists that can contain, for instance, generic words, application specific words, learned words and the like.

An object of aspects of the invention is to facilitate generating text in a handheld electronic device. In another sense, an object is to assist the generation of text by processes that utilize lists of words, ideograms and the like by gathering new language objects from sources of text external to the handheld electronic device.

DESCRIPTION

The generation of text in a handheld electronic device that utilizes lists of language objects, such as for example, words, abbreviations, text shortcuts, and in some languages ideograms and the like to facilitate text generation, adapts to the user's experience by adding new language objects gleaned from text received from sources external to the handheld electronic device. An exemplary external source of text is e-mail messages. Additional non-limiting examples include SMS (Short Message Service), MMS (Multi-Media Service) and instant messages.

More particularly, aspects of the invention are directed to a method of entering text into a handheld electronic device. The handheld electronic device has at least one application for receiving text from sources external to the handheld electronic device and a text input process that accesses at least one list of stored language objects to facilitate generation of text. The general nature of the method can be stated as including processing received text received from an external source comprising scanning the received text for any new language objects not in any list of stored language objects, and identifying any of the new language objects that fail to meet a number of specified characteristics that are at least partially determinative of a language.

Aspects of the invention also embrace a handheld electronic device having a plurality of applications including at least one that receives text from a source external to the handheld electronic device. The device also includes a user interface through which a user inputs linguistic elements and a text generator that has a first language object list and a new language object list and a text input processor. This text input processor comprises processing means selecting new language objects not in the first or new list and identifying any of the new language objects that fail to meet a number of specified characteristics that are at least partially determinative of a language, and means using selected language objects stored in the first list and the new list to generate the desired text from the linguistic elements input through the user interface. This handheld electronic device also includes an output means presenting the desired text to the user.

Figure 1:
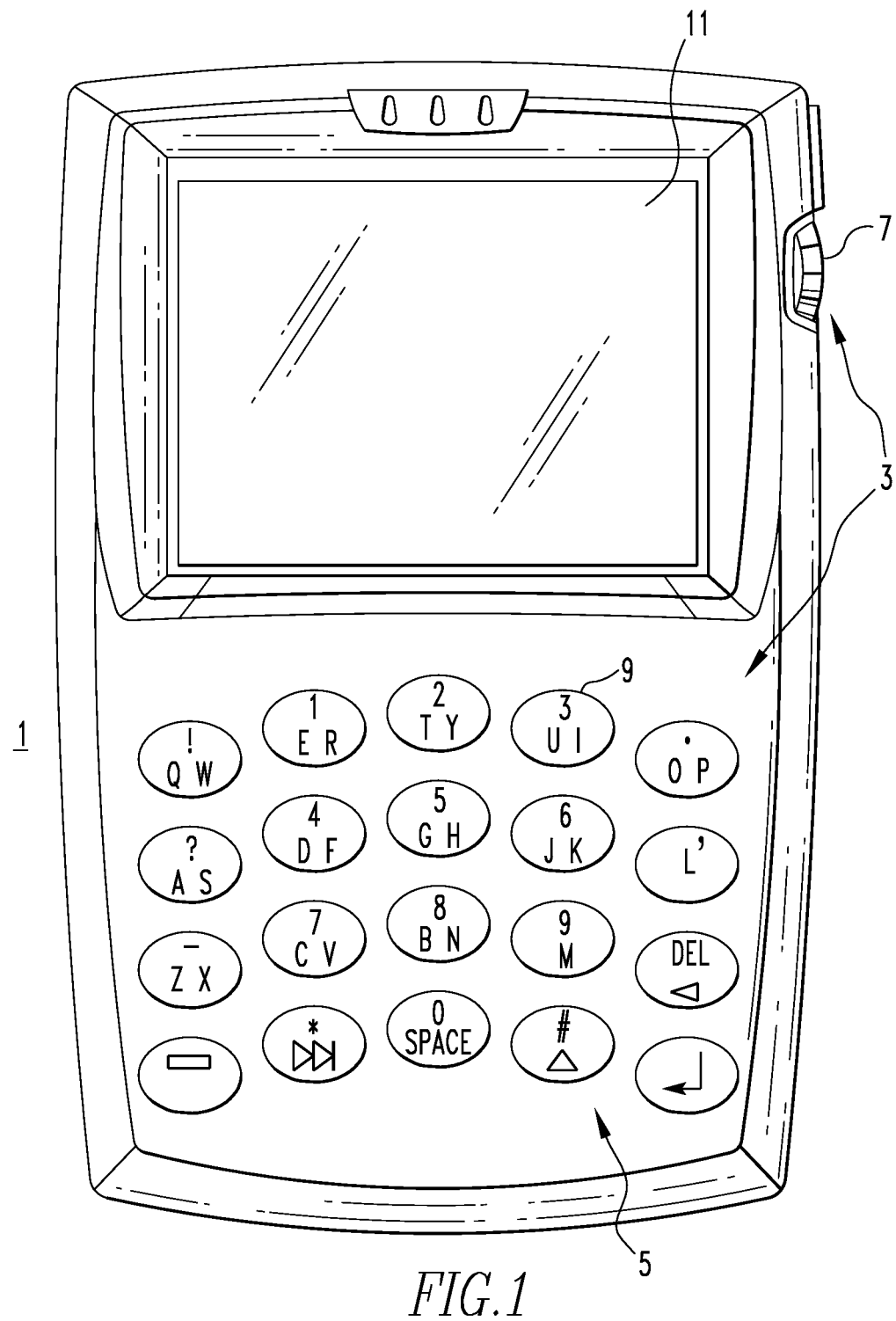
FIG. 1 is a front view of an exemplary handheld electronic device incorporating aspects of the invention.

FIG. 1 illustrates a wireless handheld electronic device 1, which is but one type of handheld electronic device to which aspects of the invention can be applied. The exemplary handheld electronic device 1 includes an input device 3 in the form of a keyboard 5 and a thumbwheel 7 that are used to control the functions of the handheld electronic device 1 and to generate text and other inputs. The keyboard 5 constitutes a reduced "qwerty" keyboard in which most of the keys 9 are used to input two letters of the alphabet. Thus, initially the input generated by depressing one of these keys is ambiguous in that it is undetermined as to which letter was intended. Various schemes have been devised for disambiguating the inputs generated by these keys 9 assigned multiple letters for input. The particular scheme used is not relevant to aspects of the invention as long as one or more linguistic lists are used in the process. The input provided through the keyboard 5 and thumbwheel 7 are displayed on a display 11 as is well known.

Figure 2:
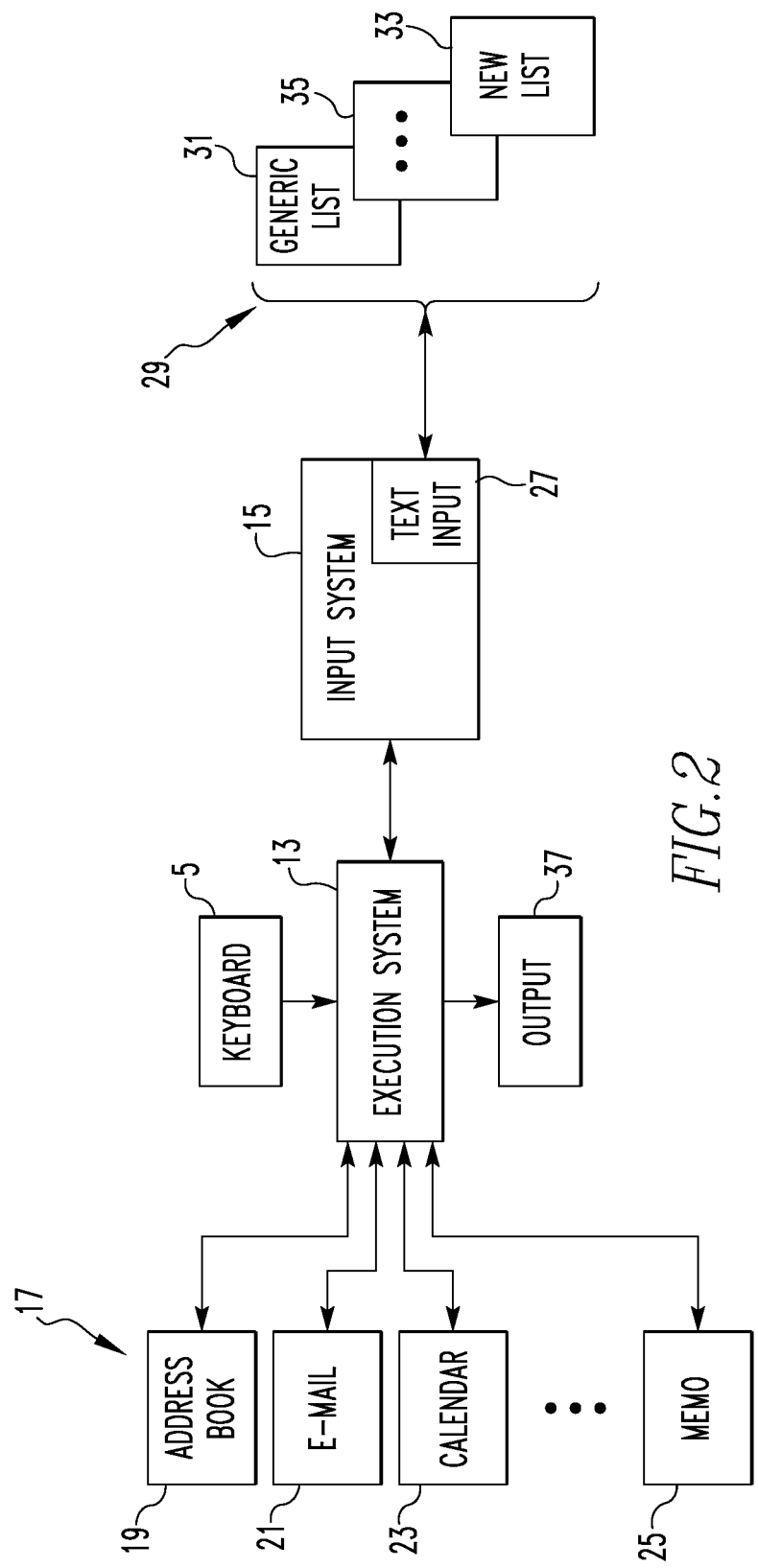
FIG. 2 is a functional diagram in block form illustrating aspects of the invention.

Turning to FIG. 2, the input device 3 provides keystroke inputs to an execution system 13 that may be an operating system, a Java virtual machine, a run time environment or the like. The handheld electronic device 1 implements a plurality of applications 17. These applications can include an address book 19, e-mail 21, a calendar 23, a memo 25, and additional applications such as, for example, spell check and a phone application. Generally these applications 17 require text input that is implemented by a text input process 27, which forms part of an input system 15.

Various types of text input processes 27 can be used that employ lists 29 to facilitate the generation of text. For example, in the exemplary handheld electronic device where the reduced "qwerty" keyboard produces ambiguous inputs, the text input process 27 utilizes software to progressively narrow the possible combination of letters that could be intended by a specified sequence of keystrokes. Such "disambiguation" software is known. Typically, such systems employ a plurality of lists of linguistic objects. By linguistic objects it is meant in the example words and in some languages ideograms. The keystrokes input linguistic elements, which in the case of words, are characters or letters in the alphabet, and in the case of ideograms, strokes that make up the ideogram. The list of language objects can also include abbreviations, and text shortcuts, which are becoming common with the growing use of various kinds of text messaging. Text shortcuts embraces the cryptic and rather clever short representations of common messages, such as, for example, "CUL8R" for "see you later", "PXT" for "please explain that", "SS" for "so sorry", and the like. Lists that can be used by the exemplary disambiguation text input process 27 can include a generic list 31 and a new list 33. Additional lists 35 can include learned words and special word lists such as technical terms for biotechnology. Other types of text input processes 27, such as for example, prediction programs that anticipate a word intended by a user as it is typed in and thereby complete it, could also use word lists. Such a prediction program might be used with a full keyboard.

Known disambiguation programs can assign frequencies of use to the language objects, such as words, in the lists it uses to determine the language object intended by the user. Frequencies of use can be initially assigned based on statistics of common usage and can then be modified through actual usage. It is known for disambiguation programs to incorporate "learned" language objects such as words that were not in the initial lists, but were inserted by the user to drive the output to the intended new word. It is known to assign such learned words an initial frequency of use that is near the high end of the range of frequencies of use. This initial frequency of use is then modified through actual use as with the initially inserted words.

Aspects of the present invention are related to increasing the language objects available for use by the text input process 27. One source for such additional language objects is the e-mail application. Not only is it likely that new language objects contained in incoming e-mails would be used by the user to generate a reply or other e-mail responses, such new language objects could also be language objects that the user might want to use in generating other text inputs.

Figure 3:
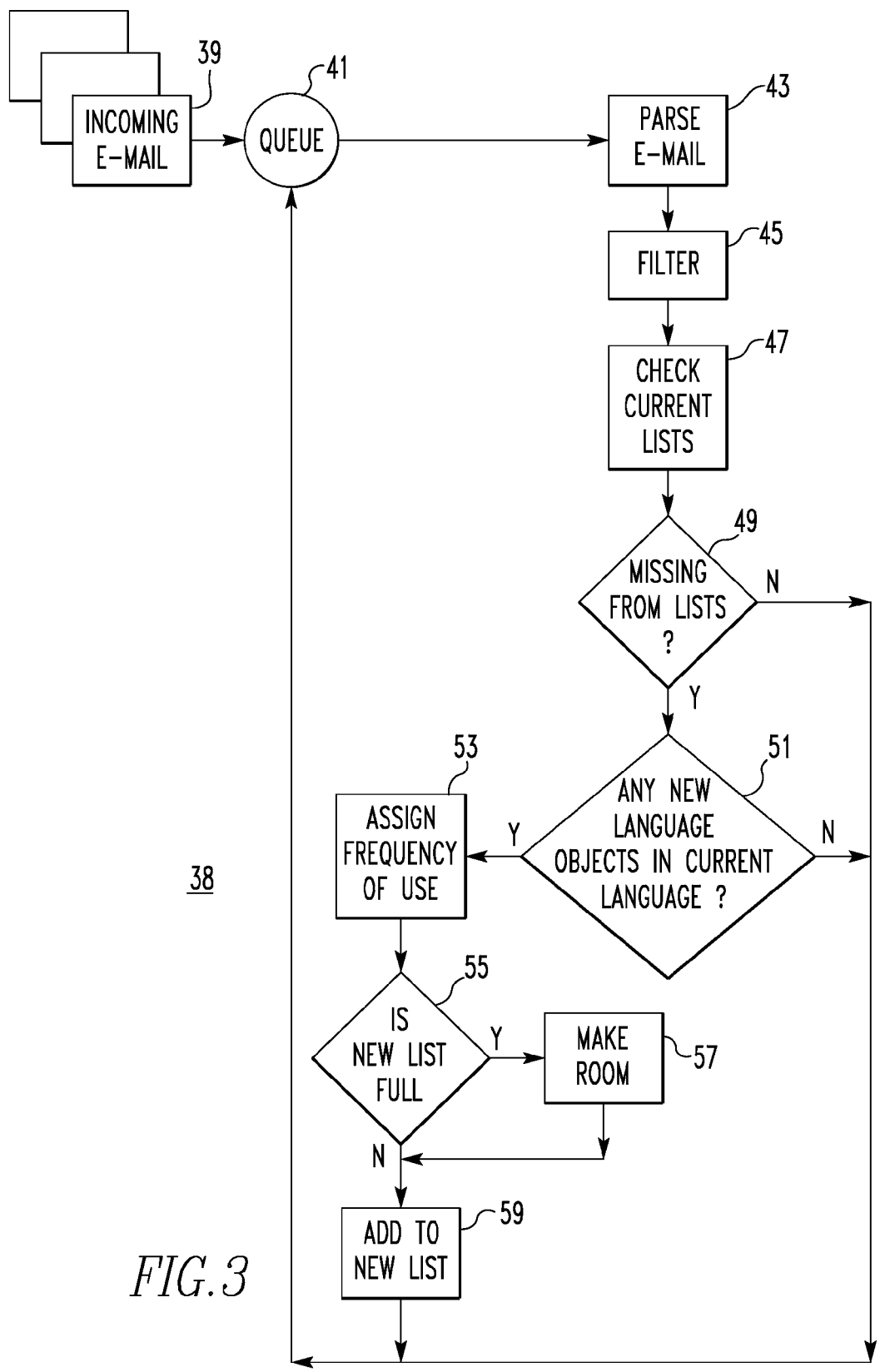
FIG. 3 is a flow chart illustrating operation of aspects of the invention.
Figure 4:
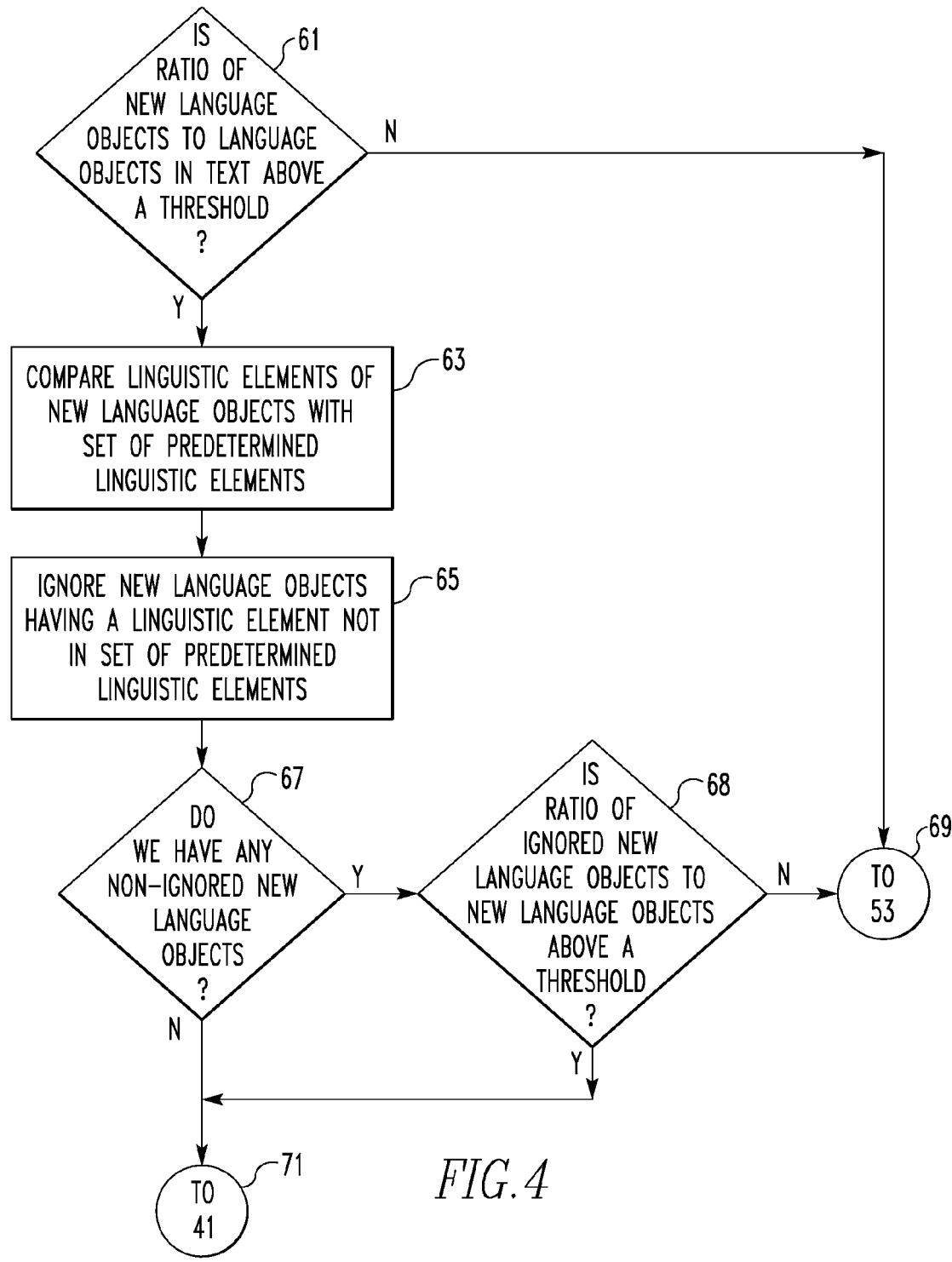
FIG. 4 is a flow chart illustrating operation of aspects of the invention.

FIGS. 3 and 4 illustrate a flow chart of a routine 38 for harvesting new language objects from received e-mails. The incoming e-mails 39 are placed in a queue 41 for processing as permitted by the processing burden on the handheld electronic device 1. Processing begins with scanning the e-mail to parse the message into words (language objects) at 43. The parsed message is then filtered at 45 to remove unwanted components, such as numbers, dates, and the like. The language objects are then compared with the language objects in the current lists at 47. If it is determined at 49 that none of the language objects in the received text are missing from the current lists, such as if all of the language objects in the incoming e-mail message are already in one of the lists as determined at 47, then the routine 38 returns to the queue at 41. The text input process then initiates scanning of the next incoming e-mail in the queue as processing time becomes available.

However, if any of the language objects examined at 47 are determined at 49 to be missing from the current lists, meaning that they are new language objects, processing continues to 51 where it is determined whether any of the new language objects can be considered to be in the current language being employed by the user on the handheld electronic device 1 to input text. An example of the processing at 51 is described in greater detail in FIG. 4 and below. If it is determined at 51 that no new language objects are in the current language, all of the new language objects are ignored, and the routine returns to the queue at 41. If, however, it is determined at 51 that a new language object is in the current language, each such new language object in the current language is assigned a frequency of use at 53. This assigned frequency of use will typically be in the high range of the frequencies of use, for the example, at about the top one third. These new words are placed in the new list 33. However, such a list will have a certain finite capacity, such that over time the new list can become full, as determined at 55. If such is the case, room must be made for this latest entry. Thus, at 57, room is made in the new list by removing one of the earlier entries. In the exemplary embodiment, where the new words are assigned a selected high initial frequency of use, and that frequency of use diminishes through operation of the disambiguation routine of the text input process, the word with the lowest frequency of use can be removed from the new list to make room for the latest new word. Alternatively, the stored new language object having a time stamp that is oldest can be removed. Accordingly, this latest new word is added to the new list at 59 and the routine returns to the queue at 41.

An exemplary language analysis procedure, such as is performed at 51, is depicted in detail in FIG. 4. It is first determined whether the ratio of new language objects in at least a segment of the text to the total number of language objects in the segment exceeds a predetermined threshold. For instance, if an analysis were performed on the text on a line-by-line basis, the routine 38 would determine at 61 whether the quantity of new language objects in any line of text is, for example, ten percent (10%) or more of the quantity of language objects in the line of text. Any appropriate threshold may be employed. Also, segments of the text other than lines may be analyzed, or the entire text message can be analyzed as a whole. The size of the segment may be determined based upon the quantity of text in the message and/or upon other factors. If it is determined at 61 that the threshold has not been met, the new language objects in the text are accepted as being in the current language, and processing continues onward to 53, as is indicated at the numeral 69 in FIG. 4.

On the other hand, continuing the example, if it is determined at 61 that in any line or other segment of text the threshold is exceeded, processing continues at 63 where the linguistic elements in all of the new language objects in the text are compared with a set of predetermined linguistic elements. A determination of the ratio of new language objects to language objects and the set of predetermined linguistic elements are non-limiting examples of specified characteristics that may be at least partially indicative of or particular to one or more predetermined languages.

If, for example, the current language is English, an exemplary set of predetermined linguistic elements indicative of the English language might include, for instance, the twenty-six Latin letters, both upper and lower case, symbols such as an ampersand, asterisk, exclamation point, question mark, and pound sign, and certain predetermined diacritics. If a new language object has a linguistic element other than the linguistic elements in the set of predetermined linguistic elements particular to the current language, the new language object is considered to be in a language other than the current language. If the English language is the current language used on the handheld electronic device 1, such as if the language objects stored in the lists 29 are generally in the English language, the routine 38 can identify and ignore non-English words.

If any new language objects are identified at 63 as having a linguistic element not in the set of predetermined linguistic elements, such new language objects are ignored, as at 65. The routine 38 then determines at 67 whether any non-ignored new language objects exist in the text. If yes, the routine 38 then ascertains at 68 whether a ratio of the ignored new language objects in the text to the new language objects in the text exceeds another threshold, for example fifty percent (50%). Any appropriate threshold may be applied. For instance, if the routine 38 determines at 68 that fifty percent or more of the new language objects were ignored at 65, processing returns to the queue at 41, as is indicated at the numeral 71 in FIG. 4. This can provide an additional safeguard against adding undesirable language objects to the new list 33. On the other hand, if the routine 38 determines at 68 that fewer than fifty percent of the new language objects were ignored at 65, processing continues at 53, as is indicated in FIG. 4 at the numeral 69, where the non-ignored new language objects can be added to the new list 33.

If it is determined at 67 that no non-ignored new language objects exist in the text, processing returns to the queue at 41 as is indicated in FIG. 4 at the numeral 71. It is understood that other language analysis methodologies may be employed.

The above process not only searches for new words in a received e-mail but also for new abbreviations and new text shortcuts, or for ideograms if the language uses ideograms. In addition to scanning e-mails for new words, other text received from sources outside the handheld electronic device can also be scanned for new words. This can include gleaning new language objects from instant messages, SMS (short message service), MMS (multimedia service), and the like.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of gathering new language objects for use by a handheld electronic device having at least one application for receiving text from sources external to the handheld electronic device and a text input process that accesses at least one list of stored language objects stored in said handheld electronic device to facilitate generation of text in a current language employed by said handheld electronic device, the method comprising:
   processing in said handheld electronic device received text received in said handheld electronic device from an external source comprising scanning the received text and identifying one or more new language objects therein that are not in any of the at least one list of stored language objects;
   identifying in said handheld electronic device all of the one or more new language objects that are not considered to be in said current language;
   responsive to identifying one or more new language objects that are not considered to be in said current language, ignoring in said handheld electronic device said all of the one or more new language objects identified as not being considered to be in said current language; and
   adding in said handheld electronic device each of the one or more new language objects that has not been identified as not being considered to be in said current language to the at least one list of stored language objects stored in said handheld electronic device for use by the text input process;
   wherein each new language object comprises a number of characters, wherein the handheld electronic device has a list of predetermined characters that correspond with the current language, and wherein said identifying further comprises determining whether any of the new language objects comprises at least a first character different than the predetermined characters in the list.

2. The method of claim 1, wherein said identifying comprises determining that a ratio of the quantity of new language objects in at least a segment of the received text with the quantity of language objects in the at least a segment of the received text exceeds a predetermined threshold.

3. A handheld electronic device comprising:
   a plurality of applications that utilize text and at least one of which receives text from a source external to the handheld electronic device;
   a user interface through which a user inputs linguistic elements for generating text;
   a text generator employing a current language comprising:
      a first list storing language objects;
      a new list storing new language objects; and
      a text input processor comprising means for identifying from among language objects contained in received text received from the source external to the handheld electronic device one or more new language objects that are not in the first list or the new list, for identifying all of the one or more new language objects that are not considered to be in said current language, for ignoring said all of the one or more new language objects that are identified as not being considered to be in said current language responsive to the identifying, and for adding each of the one or more new language objects that has not been identified as not being considered to be in said current language to the new list, and means for using selected language objects stored in the first list and the new list to generate the desired text from the linguistic elements input through the user interface,
   wherein each new language object comprises a number of characters, wherein the handheld electronic device has a list of predetermined characters that correspond with the current language, and wherein the text generator is adapted to identify all of the one or more new language objects that are not considered to be in said current language by performing processing that includes determining whether any of the new language objects comprises at least a first character different than the predetermined characters in the list; and
   an output means presenting the desired text to the user.

4. The handheld electronic device of claim 3, wherein the text generator is adapted to identify all of the one or more new language objects that are not considered to be in said current language by performing processing that includes determining that a ratio of the quantity of new language objects in at least a segment of the received text with the quantity of language objects in the at least a segment of the received text exceeds a predetermined threshold.

<p style="text-align:center">* * * * *</p>